United States Patent
Kraus et al.

(10) Patent No.: US 11,473,728 B2
(45) Date of Patent: Oct. 18, 2022

(54) METHOD FOR FILLING A HIGH PRESSURE GAS ACCUMULATOR

(71) Applicants: AUDI AG, Ingolstadt (DE); Volkswagen AG, Wolfsburg (DE)

(72) Inventors: Maik Kraus, Magdeburg (DE); Florian Hennecke, Braunschweig (DE)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 0 days.

(21) Appl. No.: 16/490,401

(22) PCT Filed: Oct. 31, 2018

(86) PCT No.: PCT/EP2018/079779
§ 371 (c)(1),
(2) Date: Aug. 30, 2019

(87) PCT Pub. No.: WO2019/096582
PCT Pub. Date: May 23, 2019

(65) Prior Publication Data
US 2020/0284396 A1    Sep. 10, 2020

(30) Foreign Application Priority Data
Nov. 17, 2017  (DE) ...................... 10 2017 220 598.9

(51) Int. Cl.
*F17C 5/06*    (2006.01)
(52) U.S. Cl.
CPC ........ *F17C 5/06* (2013.01); *F17C 2205/0305* (2013.01); *F17C 2205/0391* (2013.01);
(Continued)

(58) Field of Classification Search
CPC ................ F17C 2227/0114; F17C 5/06; F17C 2205/0391; F17C 2227/0337;
(Continued)

(56) References Cited

U.S. PATENT DOCUMENTS

| 2,930,197 A | 3/1960 | Carpenter |
| 5,232,017 A | 8/1993 | Jolley |

(Continued)

FOREIGN PATENT DOCUMENTS

| CN | 201609640 U | 10/2010 |
| CN | 104736223 A | 6/2015 |

(Continued)

*Primary Examiner* — Reinaldo Sanchez-Medina
*Assistant Examiner* — Nicole Gardner
(74) *Attorney, Agent, or Firm* — Seed Intellectual Property Law Group LLP

(57) ABSTRACT

A method for filling a high-pressure gas accumulator from a reservoir is provided, comprising: removing the gas from the reservoir, transporting the gas through a gas line to a jet pump coupled to the interior of the high-pressure gas accumulator, and generating a ring flow guided along the inside of the wall of the high-pressure gas accumulator. A high-pressure gas accumulator that is suitable for carrying out the method and has a casing having a heat-sensitive layer on the inside, and has an inlet opening that traverses the casing and the layer, wherein a jet pump coupled to the inlet opening is arranged within the casing, and wherein the jet pump is oriented to generate a guided flow to the wall of the casing opposite the jet pump with deflection therein into a ring flow flowing along the heat-sensitive layer.

13 Claims, 1 Drawing Sheet

(52) U.S. Cl.
CPC .......... *F17C 2221/012* (2013.01); *F17C 2223/0123* (2013.01); *F17C 2225/0123* (2013.01); *F17C 2227/0114* (2013.01); *F17C 2265/065* (2013.01); *F17C 2270/0168* (2013.01); *F17C 2270/0184* (2013.01)

(58) Field of Classification Search
CPC ...... F17C 2227/0339; F17C 2227/0374; B01F 2025/915; B01F 2025/931
See application file for complete search history.

(56) References Cited

U.S. PATENT DOCUMENTS

| | | | |
|---|---|---|---|
| 2007/0000561 A1* | 1/2007 | Handa | F17C 5/007 141/82 |
| 2009/0078706 A1* | 3/2009 | Ishitoya | F17C 13/04 220/562 |
| 2010/0155404 A1* | 6/2010 | Friedlmeier | F17C 5/06 220/581 |

FOREIGN PATENT DOCUMENTS

| | | | | |
|---|---|---|---|---|
| CN | 104838197 A | 8/2015 | | |
| CN | 106989270 A | 7/2017 | | |
| DE | 950026 C | * 10/1956 | ............ | B01F 5/0212 |
| DE | 28 04 550 A1 | 8/1979 | | |
| DE | 103 46 619 A1 | 5/2005 | | |
| DE | 10 2007 027 281 A1 | 12/2008 | | |
| DE | 10 2013 015 519 A1 | 3/2015 | | |
| DE | 10 2014 209 921 A1 | 11/2015 | | |
| JP | 4-266698 A | 9/1992 | | |
| JP | 2007-298051 A | 11/2007 | | |
| JP | 2008-151286 A | 7/2008 | | |
| JP | 2010-235550 A | 10/2010 | | |
| JP | 2012-97815 A | 5/2012 | | |
| JP | 2016-217361 A | 12/2016 | | |

* cited by examiner

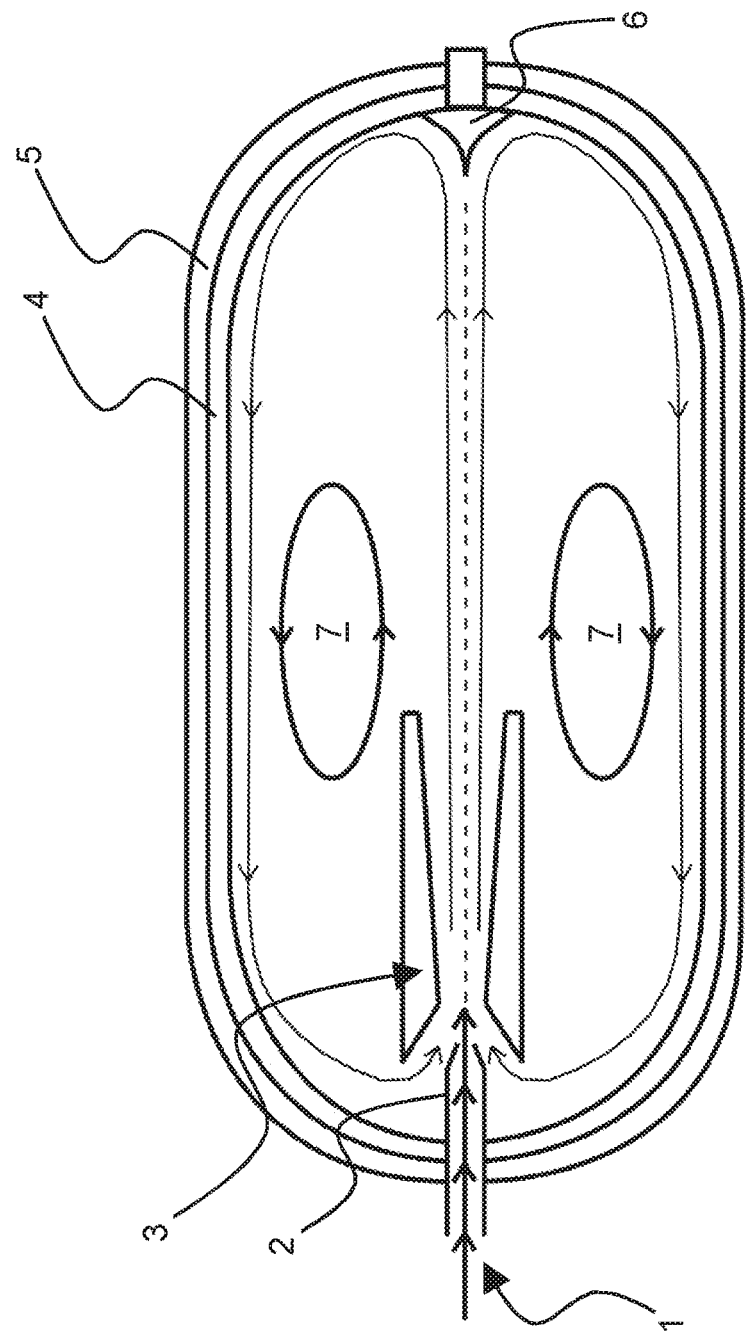

METHOD FOR FILLING A HIGH PRESSURE GAS ACCUMULATOR

BACKGROUND

Technical Field

The present disclosure is generally related to a method for filling a high-pressure gas accumulator, a high-pressure gas accumulator suitable for carrying out the method, and a vehicle with a corresponding high-pressure gas accumulator.

Description of the Related Art

Vehicles equipped with a fuel cell have a high-pressure gas accumulator in which the hydrogen required to operate the fuel cell is stored. The high-pressure gas accumulators are usually made with a CFRP casing which has a liner on its inside. This liner serves as a diffusion barrier for the hydrogen and must be protected from temperatures higher than 85° Celsius which can occur when gas is compressed when filling the high-pressure gas accumulator. Therefore, in the current protocol SAEJ2601-1, it is provided for the refueling process to pre-cool the hydrogen down to −40° Celsius in order to avoid overheating the liner material in the high-pressure gas accumulator.

A fuel system for internal combustion engines with a fuel tank for liquid fuel, which is conveyed via a suction line to a fuel pump, is known from DE 28 04 550 A1. Excess fuel can flow back to the fuel tank via a return line, wherein the orifice of the return line is designed nozzle-like and is directed in such a manner that the excess quantity flows directly into the inlet opening of the suction line.

In U.S. Pat. No. 2,930,197, the underground storage of gas in a cavern is disclosed, wherein the gas is forced through a pipeline into the oil-filled cavern. A Venturi nozzle assigned to the pipeline is used to dissolve the gas in the oil so that no free gas is present when leaving the Venturi nozzle.

BRIEF SUMMARY

The present disclosure relates to a method for filling a high-pressure gas accumulator that is improved compared to the protocol according to SAEJ2601-1, as well as to a high-pressure gas accumulator suitable for carrying out the method, and a vehicle.

A method for filling a high-pressure gas accumulator from a reservoir may comprise removing the gas from the reservoir, transporting the gas through a gas line to a jet pump assigned to the interior of the high-pressure gas accumulator, and generating a ring flow guided at least sectionally along the inside of the wall of the high-pressure gas accumulator.

One major advantage of this method is that, as a result of the use of the jet pump, starting from its orifice, a guided flow is generated. Upon hitting the wall of the high-pressure gas accumulator, the flow is deflected along the course of the wall and leads to the formation of a flow field along the wall. This creates a ring flow because the gas carried in the flow field also forms the suction medium for the jet pump. The gas supplied to the jet pump is very strongly accelerated within the jet pump, such that the jet pump leaves a strongly cooled gas jet which is the carrier of the ring flow. Thus, the wall of the high-pressure gas accumulator is intentionally shielded from the developing hot areas during filling, thus effectively preventing the liner from overheating. The jet pump does not require any moving parts, and the ring flow adjusts itself automatically due to constraints of natural laws, such that the advantages exist over the entire service life of the high-pressure gas accumulator.

Within the framework of the embodiments of the invention described herein, it is also advantageous if a cone-shaped deflector surface is arranged in the area of the wall opposite the orifice of the jet pump, by which the gas flowing out of the orifice is deflected to generate the ring flow. This cone-shaped deflector surface ensures that the gas flowing from the orifice of the jet pump is distributed symmetrically over the entire inner surface of the high-pressure gas accumulator; thus, that a flow mode in which the cooled gas flows along only a partial surface of the wall is not able to develop.

It is particularly advantageous if the jet pump has a nozzle, especially a Laval nozzle or a Coanda nozzle, with which the gas is accelerated and directed parallel to the longitudinal axis through a jet guide onto the wall opposite the jet pump. The nozzle promotes and intensifies the effect of the acceleration of the propellant gas in order to specifically adjust a flow that preferably also reaches supersonic velocity.

It is also provided that the gas is transported through the gas line without pre-cooling; that is, that it will be possible to fill the high-pressure gas accumulator with significantly lower energy consumption and a reduced complexity of the filling station. Alternatively, however, it is possible to transport the gas through the gas line using pre-cooling with a pressure increase corresponding to the extent or as a function of the pre-cooling, such that the high-pressure grass accumulator can be filled more quickly with a given energy input, thus making the refueling process more user-friendly.

A high-pressure gas accumulator may comprise a casing having a heat-sensitive layer on the inside, and an inlet opening that traverses the casing and the layer and to which a gas line can be permanently or reversibly connected, wherein a jet pump allocated to the inlet opening is arranged within the casing, and wherein the jet pump is oriented to generate a guided flow to the wall of the casing opposite the jet pump with deflection therein into a ring flow flowing along the heat-sensitive layer.

This high-pressure gas accumulator is characterized by the fact that a jet pump is integrated in its interior and, due to its intrinsic properties, provides a strongly cooled gas jet that does not dissipate arbitrarily into the gas already stored in the high-pressure gas accumulator, but is used on a targeted basis for the active cooling of the heat-sensitive layer and its shielding from hot areas within the high-pressure gas accumulator. Any connection between the inlet opening and the gas line that can be loosened and reconnected is understood to be reversible.

It has been shown to be advantageous when the jet pump has a Laval or Coanda nozzle as the driving nozzle, and when the mixing chamber is designed as a jet guide for the directed discharge of the gas.

It is advantageous for the casing to be designed as an FRP casing with a liner as a heat-sensitive layer as the inner lining, and have a cone-shaped deflector surface on a plug (guide) in the area of its wall opposite the jet pump, in particular the Laval or Coanda nozzle. The term "FRP casing" refers to a casing made of a fiber-reinforced plastic (FRP). Among others, carbon-fiber-reinforced plastic (CFRP), glass-fiber-reinforced plastic (GFRP), aramide-fiber-reinforced plastic (AFRP) and steel-fiber-reinforced plastic (SFRP) come into consideration.

The use of a plug for the cone-shaped deflector surface has the advantage that no effort is required for a more complex three-dimensional design in the production of the FRP casing; rather, a conventionally manufactured FRP casing can be retroactively provided with the cone-shaped deflector surface via the plug.

It is expedient if the jet pump, in particular the Laval or Coanda nozzle and the mixing chamber, are aligned parallel to the longitudinal axis of the casing and the length of the mixing chamber corresponds to between 5% and 50%, preferably between 25% and 35%, of the longitudinal extension of the casing. This design promotes the formation and maintenance of the ring flow since, in two areas separated by the length of the mixing chamber, the forces driving the ring flow are provided by positive pressure and negative pressure.

A vehicle with a fuel cell and a high-pressure gas accumulator specified above supports the reduction of energy consumption in a hydrogen-based energy regime.

BRIEF DESCRIPTION OF THE SEVERAL VIEWS OF THE DRAWINGS

Additional advantages, features and details result from the claims, the following description of advantageous embodiments, and using the drawing. The following is shown:

FIG. 1 the schematic representation of the longitudinal section through a high-pressure gas accumulator in the plane containing a jet pump.

DETAILED DESCRIPTION

FIG. 1 shows a schematic representation of a high-pressure gas accumulator consisting of a casing 5 formed by fiber-reinforced plastic ("FRP"). A liner 4 is arranged on the inside of the wall of the FRP casing 5; this forms a heat-sensitive layer, the heating of which above 85° Celsius must be avoided. On the left side of the drawing, an inlet opening 1 is formed in the high-pressure gas accumulator; this can be permanently or reversibly connected to a gas line. A jet pump formed by a nozzle in the form of a Laval or Coanda nozzle 2 and a mixing chamber 3 designed as a jet guide is allocated to this inlet opening 1, wherein the nozzle 2 and the mixing chamber 3 are aligned parallel to the longitudinal axis of the casing 5, and the length of the mixing chamber 3 corresponds approximately to one-third of the longitudinal extension of the casing 5. In the area of the wall opposite the nozzle 2, a cone-shaped deflector surface is arranged on a plug 6.

This high-pressure gas accumulator can be filled by feeding gas, in particular hydrogen as the propellant medium, through the gas line to nozzle 2, which gas leaves the Laval or Coanda nozzle in the direction of mixing chamber 3, by means of which gas already in the high-pressure gas accumulator is drawn in.

A strongly accelerated and cooled gas jet leaves the mixing chamber 3 in a guided flow directed parallel to the longitudinal axis, which is deflected when hitting the cone-shaped deflector surface, forming a ring flow symbolized by the arrows, which flows along the wall at least sectionally. The wall is thus shielded from hot areas 7 inside the high-pressure gas accumulator and is effectively protected against excessive heating to over 85° Celsius.

A vehicle equipped with a fuel cell and possessing such a high-pressure gas accumulator can be refueled without the need for strong pre-cooling of the hydrogen, such that the complexity of the filling station can be minimized, and the energy requirement for the filling process is significantly reduced. Alternatively, more rapid refueling is possible while maintaining pre-cooling.

Aspects of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for filling a high-pressure gas accumulator from a reservoir, comprising:
   removing a gas from the reservoir;
   transporting the gas from the reservoir through a gas line to a jet pump coupled to a first end of an interior of the high-pressure gas accumulator; and
   allowing the gas to enter the interior of the high-pressure gas accumulator such that the gas travels from the first end of the interior of the high-pressure gas accumulator to a second end of the interior of the high-pressure gas accumulator, wherein the second end of the interior of the high-pressure gas accumulator is opposite to the first end of the interior of the high-pressure gas accumulator along a central longitudinal axis of the interior of the high-pressure gas accumulator; and
   allowing the gas to be redirected at the second end of the interior of the high-pressure gas accumulator such that the gas flows radially outward with respect to the central longitudinal axis and then in a ring encircling the central longitudinal axis along an inside of a wall of the high-pressure gas accumulator toward the first end of the interior of the high-pressure gas accumulator.

2. The method according to claim 1, wherein the wall includes a cone-shaped deflector surface located opposite an orifice of the jet pump, wherein gas flowing out of the orifice is deflected by the cone-shaped deflector to generate the ring encircling the central longitudinal axis.

3. The method according to claim 1, wherein the jet pump has a Laval or Coanda nozzle, with which the gas is accelerated and directed parallel to an axis of the nozzle through a jet guide onto the wall opposite the Laval or Coanda nozzle.

4. The method according to claim 1, wherein the gas is transported through the gas line without pre-cooling.

5. The method according to claim 1, wherein the gas is transported through the gas line using pre-cooling with a pressure increase corresponding to the extent of the pre-cooling.

6. The method according to claim 1, wherein allowing the gas to enter the interior of the high-pressure gas accumulator includes providing a strongly-cooled gas jet that actively cools a heat-sensitive layer of the high-pressure gas accumulator.

7. The method according to claim 1, wherein the wall of the high-pressure gas accumulator is shielded from hot areas inside the high-pressure gas accumulator by the ring encircling the central longitudinal axis.

8. The method according to claim 7, wherein the wall of the high-pressure gas accumulator is protected against excessive heating to over 85 degrees Celsius by the ring encircling the central longitudinal axis.

9. A high-pressure gas accumulator, comprising:
a casing having an internal heat-sensitive layer;
an inlet opening that traverses the casing and the heat-sensitive layer, wherein a gas line can be permanently or reversibly connected to the inlet opening; and
a jet pump coupled to the inlet opening, wherein the jet pump is located at least partially within the casing, wherein the jet pump is oriented to generate a guided flow to a wall of the casing opposite the jet pump along a central longitudinal axis of the casing, wherein the guided flow is deflected at the wall into a ring flow encircling the central longitudinal axis and flowing toward the jet pump along the heat-sensitive layer.

10. The high-pressure gas accumulator according to claim 9, wherein the jet pump has a Laval or Coanda nozzle and a mixing chamber designed as a jet guide for a directed discharge of gas.

11. The high-pressure gas accumulator according to claim 10, wherein the jet pump and the mixing chamber are aligned parallel to the central longitudinal axis of the casing and a length of the mixing chamber is between 25% and 35% of a longitudinal length of the casing.

12. The high-pressure gas accumulator according to claim 9, wherein the casing is a fiber-reinforced plastic casing, the internal heat-sensitive layer is a liner, and the casing has a cone-shaped deflector surface on a plug formed in the wall opposite the jet pump.

13. A vehicle, comprising:
a fuel cell; and
a high-pressure gas accumulator including:
    a casing having an internal heat-sensitive layer;
    an inlet opening that traverses the casing and the heat-sensitive layer, wherein a gas line can be permanently or reversibly connected to the inlet opening; and
    a jet pump coupled to the inlet opening, wherein the jet pump is located at least partially within the casing, wherein the jet pump is oriented to generate a guided flow to a wall of the casing opposite the jet pump along a central longitudinal axis of the casing, wherein the guided flow is deflected at the wall into a ring flow encircling the central longitudinal axis and flowing toward the jet pump along the heat-sensitive layer.

* * * * *